April 9, 1935. R. HENRY 1,997,488
DRIVING CONNECTION
Filed Sept. 10, 1928 5 Sheets-Sheet 1
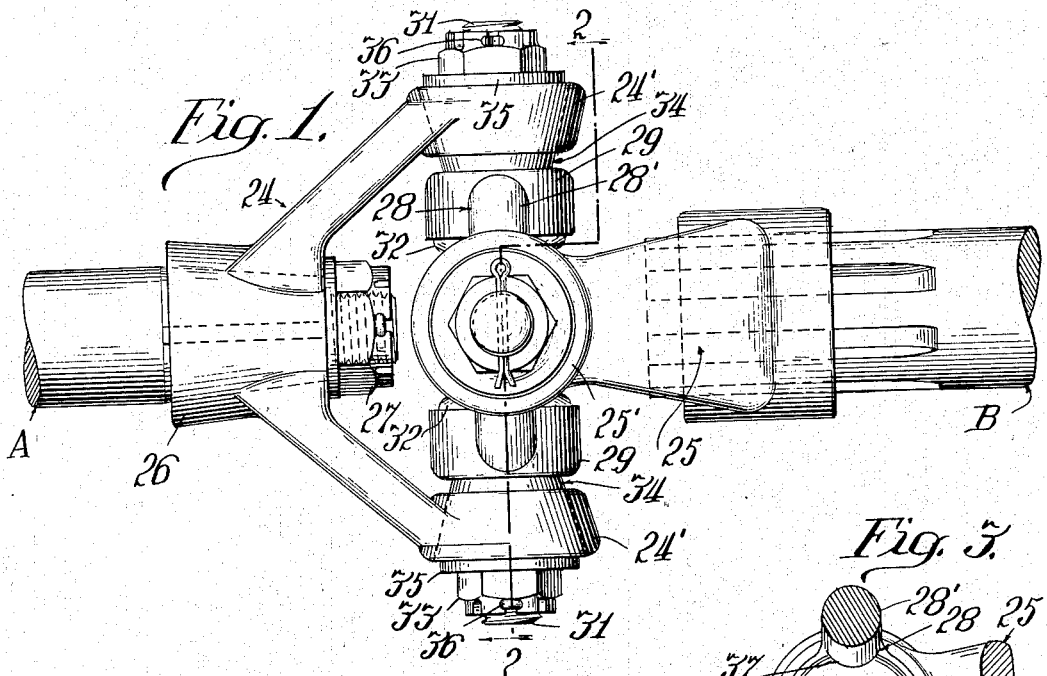
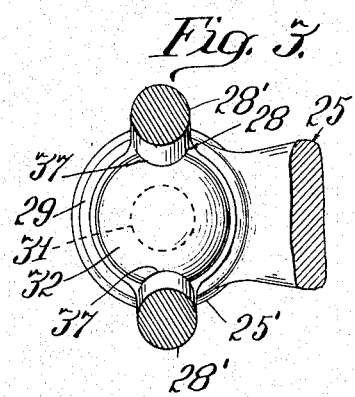
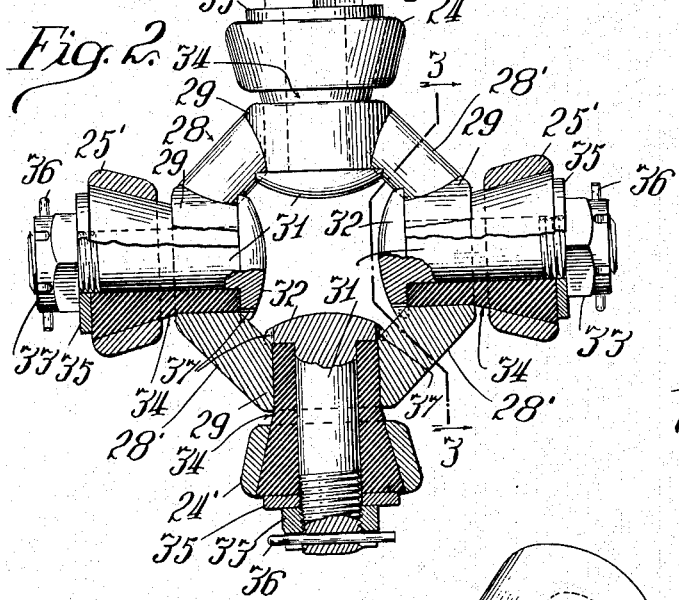
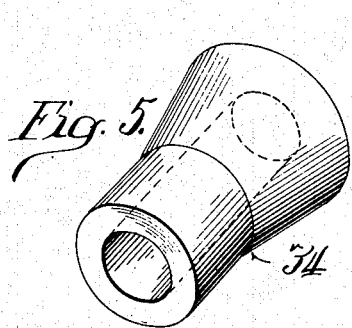
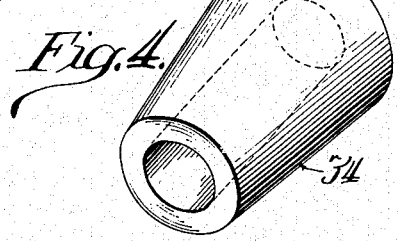
Inventor
Raymond Henry
By Brown, Jackson, Boettcher & Dienner
Attorneys
Witness
Milton Lenoir April 9, 1935.  R. HENRY  1,997,488
DRIVING CONNECTION
Filed Sept. 10, 1928  5 Sheets-Sheet 2
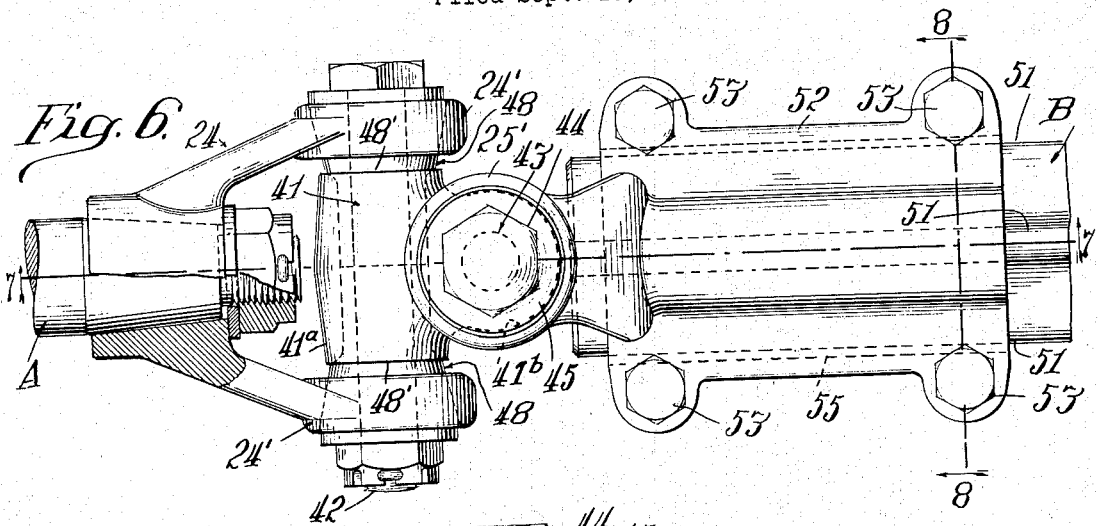
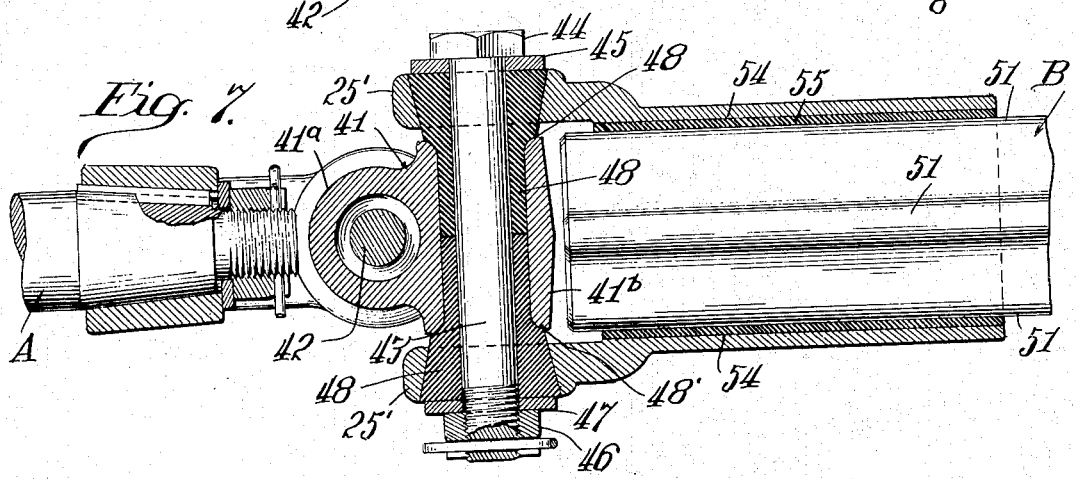
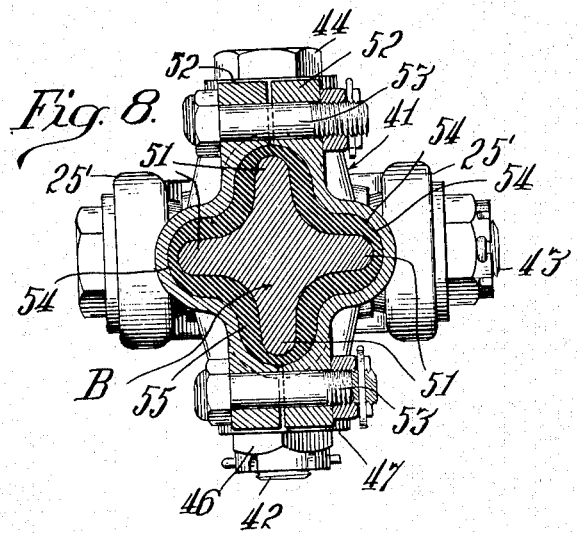
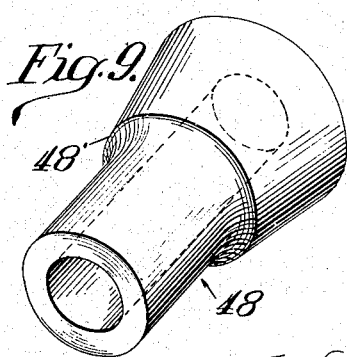
Inventor.
Raymond Henry
By Brown, Jackson, Boettcher & Dienner
Attorneys
Witness
Milton Lenoir April 9, 1935.　　　　R. HENRY　　　　1,997,488
DRIVING CONNECTION
Filed Sept. 10, 1928　　　5 Sheets-Sheet 3
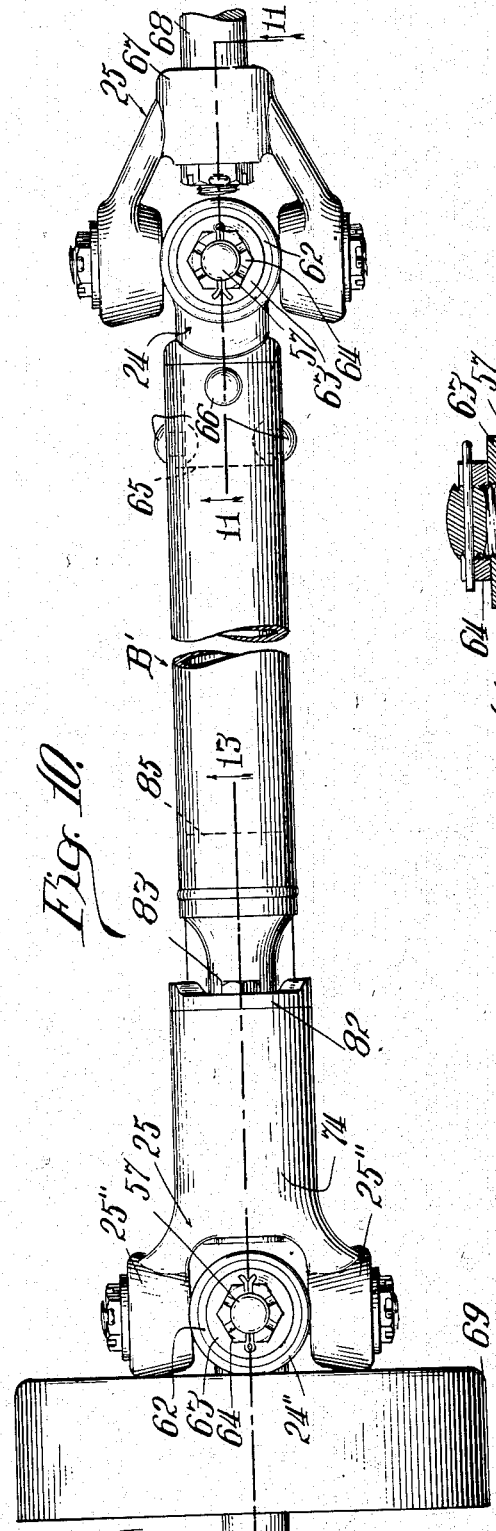
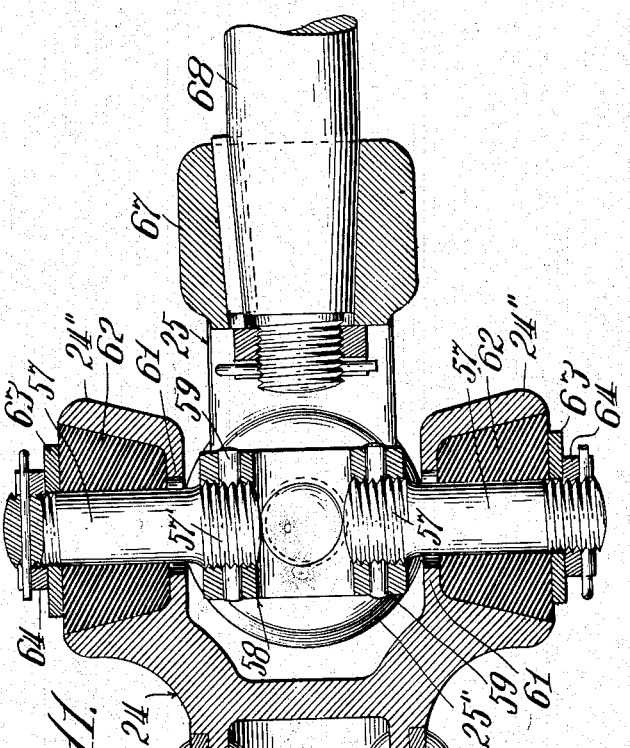
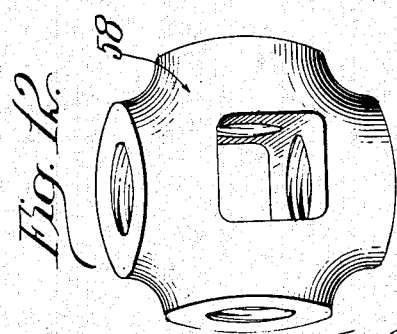
Inventor.
Raymond Henry
By Brown, Jackson, Boettcher & Dienner
Attorneys

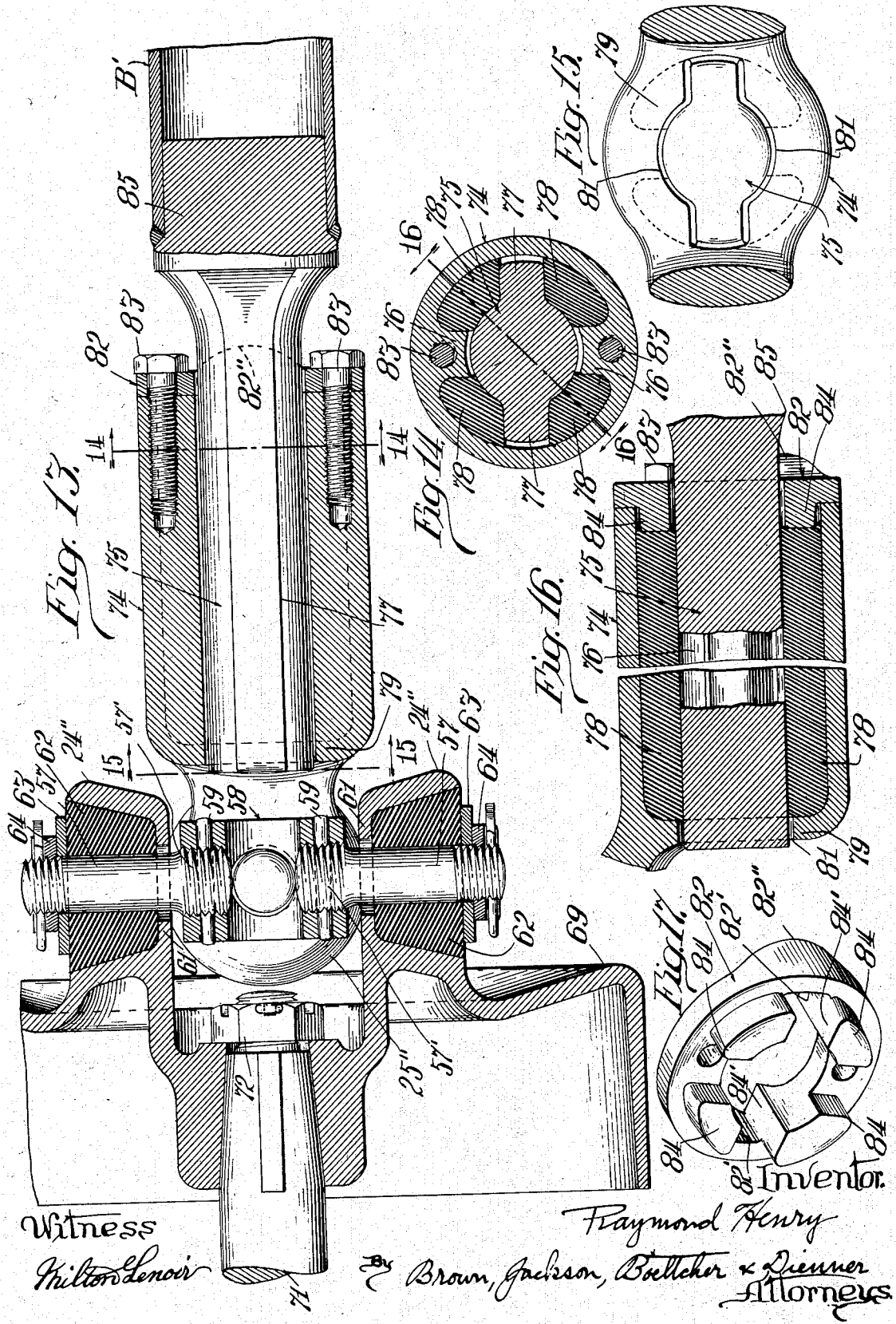

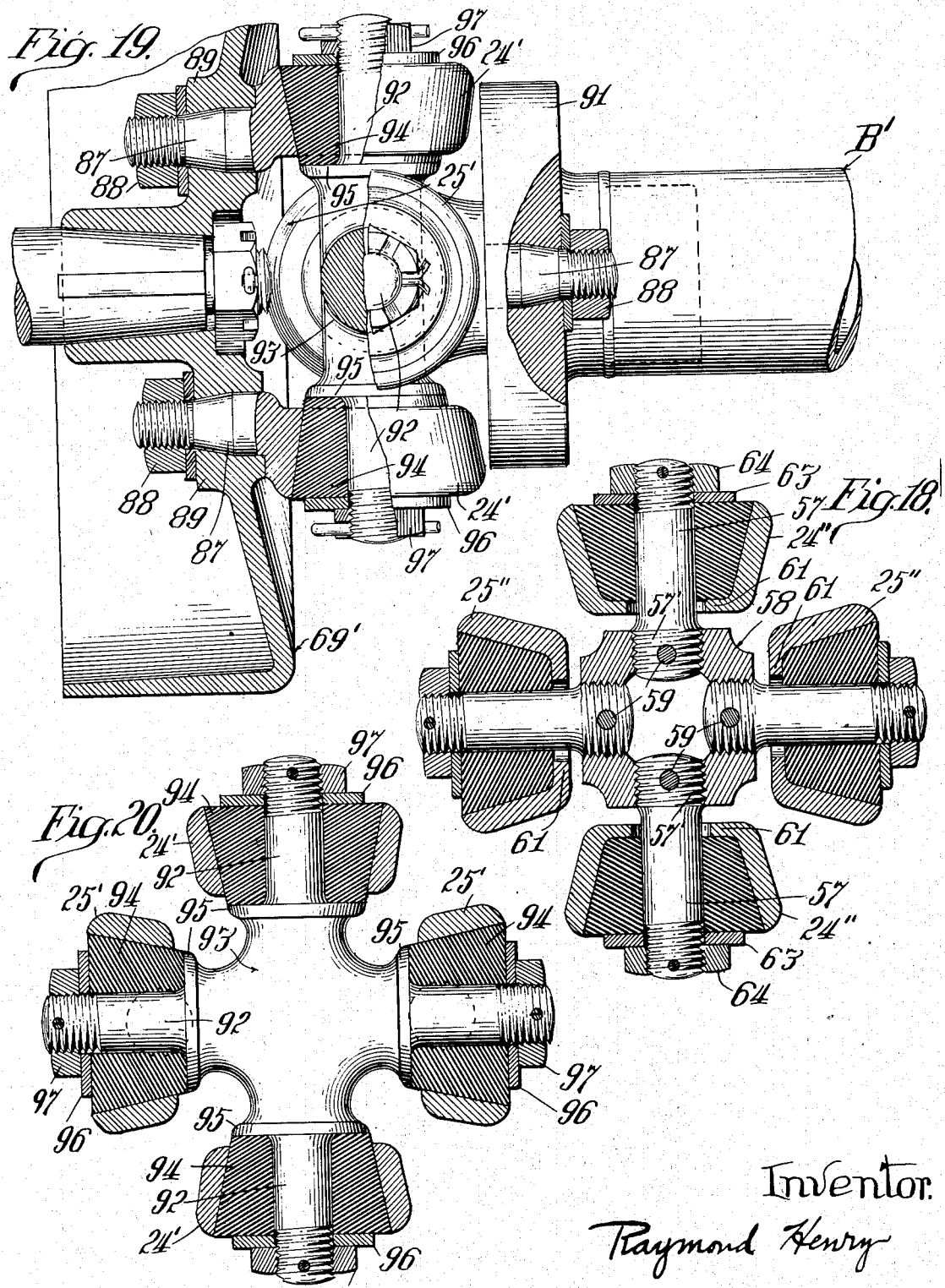

Patented Apr. 9, 1935

1,997,488

UNITED STATES PATENT OFFICE 1,997,488

DRIVING CONNECTION

Raymond Henry, Rock Island, Ill.

Application September 10, 1928, Serial No. 305,017

17 Claims. (Cl. 64—102)

The present invention relates to driving connections of a flexible character adapted for interposition in power transmitting shafts, having particular reference to such connections adapted for association with the propeller shaft of an automobile although, as will be hereinafter apparent, the invention has utility in numerous other power transmitting situations.

One of the principal objects of the invention is to provide an improved construction of universal joint in which all of the present-day difficulties of wear, noise and play are obviated, such being attained by eliminating all metal-to-metal contacts at the oscillatory bearing points of the joint. In avoiding such metal-to-metal contacts I employ elastic bushings at these points, which absorb all of the relative oscillatory movements between the working parts of the joint by elastic flexure of the bushings, instead of by sliding contact between metallic surfaces.

Thus there are no bearing surfaces to wear and develop play and noise, the present joint requiring no lubrication whatever nor any protection against dirt and grit and remaining quiet during its entire life. In addition, the joint has the further advantage of cushioning motor impulses, or such other shock forces as the driving or driven shaft may tend to transmit through the joint.

I have found that a universal joint so constructed is only successful, and the above advantages can only be obtained, when the elastic bushings are compressed under a relatively high initial pressure in their installation for maintaining pressure engagement with the relatively movable parts of the joint. The invention, therefore, contemplates as one of its important features the concept of these bushings being maintained under a permanent compression, together with the means for establishing this pressure in the bushings.

Another object of the invention is to provide an improved construction of telescopic or sleeve coupling for permitting relative endwise movement between alined sections of the power transmitting shaft. Such type of coupling is commonly employed in the propeller shaft of an automobile for permitting extension and contraction of the shaft incident to relative vertical movement between the automobile body and the rear axle. In constructing the present coupling I also avoid the necessity of sliding metal-to-metal contacts by the use of an elastic insert or inserts in the coupling, the elastic flexure of which accommodates the relative endwise movement between the coupling sections.

Such elastic insert or inserts also cushion motor impulses or such other shock forces as either shaft section may tend to transmit through the coupling. As described of the universal joint, it is also desirable to place these elastic inserts under an initial compression, and one of the features of the invention resides in the means for establishing this pressure.

Other objects and advantages of the invention will be apparent from the following description of a preferred embodiment thereof. In the accompanying drawings illustrating such embodiment:

Fig. 1 is a side elevational view of one form of the present universal joint.

Fig. 2 is a transverse view, partly in section, taken approximately on the plane of the line 2—2 of Fig. 1.

Fig. 3 is a detail sectional view taken approximately on the plane of the line 3—3 of Fig. 2.

Fig. 4 is a perspective view of one of the elastic bushings.

Fig. 5 is a similar view illustrating a modified form of bushing, or illustrating the shape which the preceding conical bushing will assume under pressure.

Fig. 6 is a side view, partly in section, illustrating a modified form of universal joint and illustrating one form of elastic extensible coupling.

Fig. 7 is an axial sectional view taken on the plane of the line 7—7 of Fig. 6.

Fig. 8 is a transverse sectional view through the extensible or sleeve coupling, corresponding to a section taken on the plane of the line 8—8 of Fig. 6.

Fig. 9 is a perspective view of one of the elastic bushings employed in the universal joint illustrated in Figs. 6 and 7.

Fig. 10 is a side elevational view of an automobile propeller shaft, illustrating a modified form of the present universal joint at the front and rear ends thereof, and illustrating a modified form of extensible coupling associated with the shaft.

Fig. 11 is a longitudinal sectional view through the rear universal joint taken on the plane of the line 11—11 of Fig. 10.

Fig. 12 is a perspective view of one form of intermediate coupling member employed in these universal joints.

Fig. 13 is a longitudinal sectional view through the front universal joint and through the telescopic coupling taken on the plane of the line 13—13 of Fig. 10.

Fig. 14 is a transverse sectional view through the extensible coupling taken on the plane of the line 14—14 of Fig. 13.

Fig. 15 is a transverse sectional view across the front end of the aforesaid coupling, taken on the plane of the line 15—15 of Fig. 13.

Fig. 16 is a fragmentary longitudinal section through the extensible coupling, taken approximately on the plane of the line 16—16 of Fig. 14.

Fig. 17 is a perspective view of the end cap of the coupling, showing the lugs which compress the elastic inserts.

Fig. 18 is a transverse sectional view through the pivot plane of one form of the universal joint.

Fig. 19 is a side view, partly in section, illustrating another form of the universal joint; and Fig. 20 is a view similar to Fig. 18 illustrating a modified construction corresponding to Fig. 19.

Referring to the construction illustrated in Figs. 1 and 2, the driving and driven sections of the propeller shaft or other line of shafting are indicated at A and B respectively, and mounted upon these shafts are the two forks or yokes 24 and 25 of the universal joint. Said yokes may be secured to their respective shafts in any suitable manner, the yoke 24 being illustrated as provided with a tapered hub 26, which is clamped over the tapered end of the shaft A by a nut 27 screwing over the end of the shaft, the hub 26 being also keyed to the tapered portion of the shaft. The other yoke 25 may be connected with its shaft B through a conventional spline coupling or through my improved form of extensible coupling, as I shall presently describe. Formed at the ends of the yoke arms are bosses or sleeves 24' and 25' respectively which have their inner surfaces sloped inwardly as illustrated to form tapering sockets for the elastic bushings. Mounted between the oppositely disposed yoke arms is an intermediate coupling member 28 having apertured bosses 29 disposed in alinement with the bosses or sleeves 24', 25'. Extending outwardly through these alined bosses are connecting pins 31 in the form of bolts having their heads 32 abutting against the inner ends of the apertured bosses 29 and having their threaded outer ends receiving nuts 33.

The shank portions of the pins 31 are considerably smaller than the apertures in the bosses 24', 25' and 29 to receive the elastic bushings 34. When these bushings are mounted over the pins in the assembled joints they completely fill the space between each pin and the tapered seating sockets 24', 25' and between each pin and the inner wall of the apertured boss 29. Means are provided for establishing endwise or axial compression in each of the elastic bushings, comprising a washer or collar 35 in cooperation with each bolt 31 and nut 33 whereby screwing the nuts inwardly forces the collars 35 against the ends of the bushings and serves to compress them longitudinally within the bosses 24', 25' and 29. After the nuts have been screwed down to the desired pressure they can be held in fixed position by cotter pins 36 adapted to pass through castellated end portions of the nuts and through holes in the bolts 31. To prevent the bolts from turning, in the operation of compressing the bushings, the bolt heads 32 are notched out at diametrically opposite points, indicated at 37 in Fig. 3, to embrace the rounded inner sides of the bar or arm portions 28' which extend diagonally between the apertured bosses 29 of the intermediate coupling member.

The elastic bushings 34 are compounded of a mixture of rubber and fabric molded into the desired form. The fabric constituent preferably consists of disintegrated or broken up shreds of fabric, proportioned to the rubber constituent in a sufficiently large ratio to give the bushings a desired firmness not possessed by pure gum rubber. This property of the bushings allows them to be drawn up under relatively heavy compression pressure through the nut 33 and washer 35, the bushings nevertheless possessing sufficient elasticity to accommodate the entire range of oscillatory movement between the pins 31 and the sleeves 24', 25' by elastic flexure occurring within the body of the bushing.

The endwise compression pressure which is permanently set up in each bushing expands the inner and outer surfaces thereof into such firm frictional engagement with the surface of the pin 31 and with the inner surfaces of the bosses 24', 25' and 29 that the greatest range of oscillatory movement between each pin and its respective boss 24' or 25', with the universal joint operating at its maximum angle, will be absorbed solely as flexure within the body of the bushing without the possibility of either surface of the bushing slipping relatively to the pin or to the boss. Thus, there is no possibility of a frictional abrading action occurring between the bushing and the metallic parts of the universal joint with consequent deterioration of the bushing. It will be obvious that inasmuch as there are no metal-to-metal sliding surfaces there is no necessity for lubrication nor for enclosing or otherwise protecting the universal joint against the entrance of dirt or grit, the permanently maintained elastic pressure of the bushing sealing all surfaces with which it is in contact against the entrance of dirt. The permanently maintained compression pressure in each bushing also has the further advantage of eliminating whip and vibration in the propeller shaft. This is consequent upon the substantial elimination of all end play of the pins 31 relatively to their respective yokes. That is to say, in the absence of endwise compression pressure in the bushings the intermediate coupling member 28 is free to vibrate laterally with respect to the center of rotation of the driving yoke 24, and the driven yoke 25 is free to vibrate laterally relatively to the driving yoke 24 and relatively to the intermediate coupling member 28, whereby the rearwardly extending portion B of the propeller shaft receives the cumulative effect of both lateral vibrations.

This is effectively avoided in the present construction owing to the fact that the endwise pressure maintained in each bushing holds the intermediate coupling member 28 properly centered with respect to driving yoke 24 and also holds the driven yoke 25 properly centered with respect to the intermediate coupling member.

The bushings may be molded with a continuous taper throughout their entire lengths, as illustrated in Fig. 4, the end pressure exerted through the washer 35 serving to force the bushing into the inner boss 29, at which time the bushing will assume the formation approximately illustrated in Fig. 5; or, the bushing may first be molded in the form illustrated in Fig. 5. If desired, the bore in each boss 29 may be formed conical to provide a tapered seating surface for the bushing similarly to the tapered seating socket in the bosses 24' and 25'. In the construction illustrated it will be observed that the inner end or bottom of the socket in each boss 29 is defined by the inner face of the bolt head 32, such construction being preferable as it allows the entire sectional thickness of the bushing to be effective for absorbing torque shock, although, if desired, a rib or flange may be extended inwardly at the bottom of the boss 29 with the inner edge of said flange spaced from the shank of the bolt 31. As above indicated, the transverse elasticity in each bushing 34 serves to absorb torque pulsations or any other torsional shock which either shaft section might tend to transmit through the universal joint. It will be observed that the inner sides of the bosses or sleeves 24' and 25' are spaced from the outer sides of the bosses 29 so that no metallic contact and consequent wear can occur between these parts, the endwise pressure established in the bushings permitting of this floating support of the intermediate coupling member between the two yokes.

The driven yoke 25 may be connected with the propeller shaft B through the slidable spline coupling illustrated in Fig. 1 or through any of the elastic extensible couplings to be hereinafter described.

Figs. 6 and 7 illustrate a modified form of universal joint wherein the pivot axes connecting the intermediate coupling member or knuckle block with the two yokes are disposed in offset planes. The driving yoke 24 comprises the tapered bosses or sleeves 24' as previously described, and the driven element of the joint also comprises the tapered bosses or sleeves 25'. The coupling member or knuckle block 41 comprises two offset hubs 41a and 41b extending at right angles to each other, the hub 41a being alined with the bosses 24' and the hub 41b being alined with the bosses 25'. A coupling pin in the form of a bolt 42 extends entirely through the bosses 24' and hub 41a, and a similar coupling pin 43 extends entirely through the bosses 25' and hub 41b. The head 44 of each bolt bears upon a washer 45 and a nut 46 screwing over the threaded end of the bolt bears against a washer 47, the elastic bushings being compressed between the washers 45 and 47. Each pivot bolt 42 and 43 is separated from the bosses of its yoke and from the alined hub or boss of the knuckle block by two similar elastic bushings 48 which are inserted in place from opposite sides of the yoke. As shown in Figs. 7 and 9, each bushing comprises a conical head portion which seats in the tapered socket of the yoke, and a tubular body portion which extends into the hub or boss of the intermediate coupling member, such tubular body portion being preferably formed cylindrical although it may be formed conical if desired.

A shoulder 48' is preferably provided at the base of the frusto-conical head to seat against the rounded end of the bore in the coupling member. The inner ends of the two bushings contact with each other at the center of said bore whereby their compression pressures are transmitted to each other. It will be evident that by drawing up on the nut 46 of the associated bolt the two bushings will be compressed endwise, thereby expanding their outer surfaces into tight engagement with the yoke bosses and with the boss of the coupling member, and also expanding the inner surfaces into tight engagement with the bolt. In this construction, as well as in the various other constructions illustrated in the drawings the bushings are originally molded longer than the space they are to fill so that they will be of the proper length when compressed endwise; also in each instance the bushings are sufficiently surrounded or confined to permit a relatively heavy compression being set up therein without the bushing bulging outwardly to an objectionable degree at different points, the relatively firm character of the bushing resulting from its fabric content also cooperating in this regard to sustain these compression pressures without injury to the bushings and without outward bulging.

It will be noted in Figs. 6 and 7 that the pins 42—43 have a resilient mounting in the coupling member 41, by virtue of the bushings 48 extending into the bosses 41a and 41b, which resilient mounting permits some of the relative oscillatory movement of the joint to occur between the pins and coupling member, and also results in torsional shock being absorbed between the pins and coupling member. The construction shown in Figs. 1 and 2 also has the same characteristic of absorbing torsional shock between the pins and coupling member by virtue of the bushings 34 extending into the bosses 29 between the pins and coupling member. It will be evident that the modified construction illustrated in Figs. 6 and 7 also has the aforementioned attributes of avoiding all metal-to-metal contact between oscillatory parts and of avoiding vibration and whip of the intermediate coupling member and of the rearwardly extending propeller shaft.

Figs. 6, 7 and 8 also illustrate an elastic extensible coupling between the universal joint and the shaft B. This end of said shaft has a sectional formation resembling a cross (Fig. 8) comprising a plurality of radially extending arms or ribs 51 extending longitudinally of the shaft.

Engaging over this portion of the shaft is a sleeve composed of two sections 52, 52 which are clamped together in assembled relation by bolts 53 passing through apertured lugs adjacent to the ends of the sleeve sections 52. The yoke arms in which the bosses 25' are formed are preferably constructed as integral parts of the sleeve sections 52, although these parts may be constructed separately and joined together in any suitable manner if desired. The sleeve sections are formed with longitudinally extending grooves or channels 54 shaped to conform substantially with the ribs 51 on the shaft B. Interposed between the shaft and sleeve throughout the entire length of the sleeve is an elastic insert 55 which is also molded of a compound of rubber and fabric, as described of the aforementioned bushings. This elastic insert is caused to conform to the irregular surfaces of the shaft and sleeve and is compressed into tight engagement with said surfaces by the pressure established between the two sleeve sections in drawing up on the bolts 53. The relatively heavy compression of the elastic insert establishes such high frictional pressure between the surfaces of the insert and the surfaces of the shaft and sleeve that all relative movement between the shaft and sleeve occurs as flexure of the insert rather than as relative sliding movement between the contacting surfaces of the parts. That is to say, in any endwise movement of the shaft within the sleeve incident to the extension or contraction of the effective length of the shaft the elastic insert will yield or flex along longitudinal lines so that the relative movement between the shaft and sleeve will be absorbed by the elasticity of the insert and there will be no sliding of the insert along either the shaft or sleeve.

It will be apparent that the foregoing construction of expansible coupling avoids all metal-to-metal sliding contacts with their consequent wear, and avoids the usual play and noise which develops in these couplings. The construction shown also has the further advantage of cushioning torque impulses or other torsional shocks transmitted in either direction through the coupling. The irregular sectional formation of the shaft and of the sleeve increases the effective surface area with which the elastic insert engages.

Fig. 10 shows a complete propeller shaft assembly, illustrating universal joints of the present invention at the front and rear ends of the shaft and illustrating another form of elastic extensible coupling between the front universal joint and the shaft. Fig. 11, corresponding to a section through the rear portion of the propeller shaft, illustrates a modified form of universal joint. In this construction the pins or bolts are rigidly secured to the intermediate knuckle block or coupling member, and the elastic bushings are in the form of short conical sections. The pins 57 have threaded inner ends 57' which screw into tapped holes in the intermediate coupling block 58. Such coupling block is illustrated in Fig. 12, and the mounting of the four pins therein is illustrated in Fig. 18, from which latter figure it will be seen that the interior of the block is preferably hollow and the pins are rigidly secured in the threaded bosses of the block by transverse keys or pins 59 passing through the block and through the threaded portions 57' of the coupling pins. The sleeves at the ends of the yokes 24 and 25 are constructed in the form of tapering cup-shaped pockets 24'' and 25'', each comprising an inwardly extending flange 61 for substantially closing the bottom of the pocket.

The annular opening in this bottom flange through which the pin 57 extends is made sufficiently larger than the shank of the pin to permit the desired amount of lateral freedom of the pin in the socket. The elastic bushings 62 are of short conical formation adapted to seat on the inwardly extending flange 61 at the bottom of each boss or pocket 24'', 25''. Engaging over the outer end of each bushing is the washer 63 and nut 64 which serve to compress the bushing axially of the pin 57 for expanding the bushing into firm engagement with the pin and with the side and bottom walls of the cup-shaped pockets 24'', 25''. These bushings are also composed of a compound of rubber and fabric, and by virtue of the longitudinal compression thereof the same advantages are obtained as described of the preceding embodiments. In the case of the rear universal joint the yoke 24 would preferably be formed with a tubular boss 65 having telescopic engagement with the tubular propeller shaft B' and secured thereto by rivets 66, and the other yoke 25 would preferably be formed with a hub 67 which is keyed and clamped to the short section of shaft 68 extending into the differential housing.

Fig. 13 illustrates a typical adaptation of this same construction in the front universal joint. Frequently this front joint is associated directly with the propeller shaft brake drum 69, and to simplify the construction and assembly of the mechanism I contemplate forming the cup-shaped sleeves or pockets 24'' as integral extensions of the web portion of the brake drum. It will be understood that in the previously described constructions illustrated in Figs. 1, 2, 6 and 7 the bosses or sleeves 24' can also be formed integral with the propeller shaft brake drum in this same manner.

71 indicates the stub shaft leading from the selective speed transmission mechanism, and on which shaft the brake drum is mounted, being secured thereto by a nut 72 screwing over the threaded end of the shaft 71, which nut is accessible through the central space between the pocket extensions 24''. The mounting of the pins 57 in the intermediate coupling block 58 and the detail construction in other respects is substantially a duplication of that illustrated in Figs. 11, 12 and 18.

I have shown the yoke 25 of this front joint as being connected with a modified form of extensible coupling. The arms of the yoke are formed integral with or are otherwise secured to a relatively long sleeve 74 into which extends a shaft section 75. Referring to Fig. 14, the interior of the sleeve is cylindrical with the exception of two diametrically opposite ribs 76 extending longitudinally throughout the length of the sleeve. The shaft 75 is formed with two corresponding ribs or flanges 77 extending along the length of the shaft at diametrically opposite sides thereof, the rims 77 being disposed within the sleeve substantially at right angles to the ribs 76. The inner surfaces of the ribs 76 are spaced from the cylindrical surface of the shaft, and correspondingly the outer surfaces of the ribs 77 are spaced from the cylindrical inner surface of the sleeve, so that no metallic contact occurs between the shaft and sleeve. Filling the arcuate spaces defined between these pairs of ribs are elastic inserts 78, 78 which extend substantially throughout the entire length of the sleeve.

The front ends of these arcuate inserts abut the front wall 79 which substantially closes the front end of the sleeve 74. As shown in Fig. 15, the shaft 75 may be extended into or through this front wall 79 by providing the latter with an opening 81 corresponding in shape with the sectional formation of the shaft, such opening being larger than the shaft to avoid metal-to-metal contact between these parts. The elastic inserts 78 are compressed longitudinally of the coupling by an end cap 82 which is secured to the open rear end of the sleeve by cap screws 83 screwing into threaded openings tapped in the ribs 76, see Fig. 14. The inner face of the cap or plate 82 is formed with arcuate lugs 84 which enter the arcuate spaces between the pairs of ribs 76 and 77 and compress the elastic inserts 78 under the pressure of the screws 83 in drawing the plate down against the end of the sleeve 74. The inserts are originally made as long or longer than the sleeve so that they will be compressed to a considerable pressure by the lugs 84. The rear end of the shaft section 75 is formed with an enlarged head portion 85 which is welded or otherwise secured to the tubular propeller shaft B'. The ribs 77 extend back to this enlarged portion, and where they pass through the end cap 82 the latter is formed with slotted openings 82' (Fig. 17), this portion of the cap being reenforced by raised ribs or protuberances 82''. The side surfaces 84' of the slots and of the coextensive lugs 84 (Fig. 17) are spaced from the adjacent surfaces of the ribs 77 so that the shaft and sleeve can oscillate relatively to each other to a limited degree without the ribs 77 striking the adjacent lugs 84.

The elastic inserts 78 are also composed of fibrous rubber compounded of rubber and fabric. The endwise compression thereof established through the end plate 82 firmly binds these inserts to the sleeve and to the shaft so that relative telescopic movement between these two parts occurs entirely through longitudinal flexure or distortion of the inserts rather than by sliding contact between any of these parts. The sleeve and shaft are also free to oscillate angularly relatively to each other for the purpose of absorbing torsional strain or shock, the elastic inserts being compressed between the ribs 76 and 77 in such relative movement. The long length of the coupling and the permanent pressure established in the inserts maintains the shaft and sleeve in accurate axial alinement at all times so that there is no tendency of the propeller shaft to vibrate and whip.

Fig. 19 illustrates a construction which can be readily substituted for other existing types of universal joints without necessitating any material alteration of the standard design of the parts. To this end, the bosses or sleeves 24' and 25' are each constructed as a separate unit adapted for bolting attachment to a rotary element constituting part of the line of power transmission shafting. Each of these sleeve units is formed with a laterally extending threaded stud 87 adapted to engage in a hole in the rotary mounting element and to receive a nut 88 for clamping the stud therein. As illustrative of such mounting, I have shown the studs 87 of the two sleeves 24' extending through apertured bosses 89 formed in the web portion of the propeller shaft brake drum 69', the projecting threaded ends of the studs receiving the nuts 88 on the inner side of the brake drum.

The corresponding studs of the other two sleeves 25' are illustrated as extending through holes in a flange or collar 91 secured to the end of the propeller shaft B' or to the front end of an extensible coupling such as is illustrated in Fig. 13. The shank portions of the studs 87 may be tapered if desired for binding engagement in tapered holes in the members 69' and 91. The sleeves or bosses 24' and 25' may be of straight conical formation as illustrated in Figs. 1, 2, 6 and 7, or they may be cup-shaped as illustrated in Figs. 11 and 13. The construction and arrangement of the pins 92 may correspond with any of the constructions previously described, or these pins may constitute integral extensions of the intermediate coupling block, as best illustrated in Fig. 20. This integral formation of the pins 92 and block 93 is particularly adapted to the construction shown in Fig. 19 wherein the separate sleeve units 24' and 25' can be assembled over the pins prior to the mounting of these sleeve units on the rotating elements 69' and 91. When sleeves having open inner ends are employed, corresponding to those illustrated in Figs. 1, 2, 6 and 7, the elastic bushing 94 may be brought to seat against a flanged seating surface 95 formed on the coupling block 93. The endwise compression then established in the bushing through the washer 96 and nut 97 will cause the entire inner end of the bushing to be pressed against the seating surface 95, which will increase the area of frictional engagement between the bushing and the surfaces of the coupling block.

While I have described several forms of my invention representing what I consider to be preferred constructions, it will be understood that the invention is not limited thereto, but can be practiced in other forms.

I claim:

1. A universal joint comprising two yokes having tapered sleeves at their ends, an intermediate coupling member including apertured bosses disposed in alignment with respect to said sleeves and having radially extending pins disposed in said bosses and extending through said sleeves, and elastic bushings compressed between said bosses and said pins, and between said tapered sleeves and said pins whereby relative oscillatory movements between the pins and sleeves and between the pins and bosses are accommodated by the flexing of said bushings.

2. A universal joint comprising two yokes disposed substantially at right angles to each other, radially extending sockets formed in the ends of the yoke arms, said sockets being of diminishing taper from their outer to their inner ends, an intermediate coupling member disposed between the arms of said yokes, bolts carried by said coupling member and extending outwardly through said sockets, elastic bushings engaging between said bolts and coupling member and having conical outer surfaces for seating in said tapered sockets, and means comprising nuts and screwing over the threaded outer ends of said bolts for compressing said bushings inwardly into said sockets to expand the same into tight engagement between said bolts and said coupling member and between the bolts and the tapered walls of said sockets whereby relative oscillatory movements between the bolts and the coupling member and between the bolts and said sockets are accommodated by flexure of the bushings.

3. A universal joint adapted for interposition in a line of power transmission shafting, comprising four sleeves having central openings providing frusto-conical seating surfaces and adapted to be disposed in alined pairs substantially at right angles to each other, said sleeves all being separate units, stud means associated with each of said sleeves for mounting the same in pairs on driving and driven rotary elements interposed in the line of shafting, an intermediate coupling member mounted between said sleeves, pins extending from said coupling member outwardly through said sleeves, and frusto-conical elastic bushings interposed between said pins and sleeves and compressed into tight frictional engagement with both whereby relative oscillatory movements between said pins and sleeves are accommodated by flexure of the bushings.

4. A universal joint adapted for inter-position in a line of power transmission shafting, comprising four sleeves having tapering sockets therein, said sleeves all being separate units and being adapted to be disposed in aligned pairs substantially at right angles to each other, attaching means associated with each of said sleeves for securing the same in pairs on driving and driven rotary elements interposed in the line of shafting, an intermediate coupling member mounted between said sleeves, seating surfaces on said coupling member extending transversely across the inner end of each sleeve in spaced relation thereto, pins extending from said seating surfaces outwardly into said sleeves, and elastic bushings compressed between said pins and sleeves, the securing of said sleeves to said rotary elements by said attachment means maintaining said elastic bushings under compression in said tapering cup-shaped sockets whereby relative oscillatory movements between said pins and sleeves are accommodated by flexure of said bushings.

5. A connection comprising two parts adapted to have relative oscillatory movement, studs carried by one of said parts and projecting therefrom substantially in axial alignment, sockets carried by the other of said parts and extending over said studs, the adjacent inner ends of said sockets having inwardly flanged bottom portions through which said studs extend, yieldable bushings between said studs and said sockets adapted to flex in the oscillatory movement between said parts, and means for compressing said bushings.

6. A connection comprising two members adapted to have relative oscillatory movement, oppositely projecting studs rigidly secured to one of said members, sockets carried by the other of said members and extending over said studs, the adjacent inner ends of said sockets having apertured bottom portions through which said studs extend, bushings of elastic material seated in said sockets against said bottom portions and surrounding said studs, and nuts screwing over said studs for compressing said bushings between said sockets and said studs.

7. A universal joint comprising two main driving and driven members adapted to have relative oscillatory movement, an intermediate member comprising four studs projecting outwardly therefrom at right angles to each other, a pair of sockets carried by the driving member and disposed over two of said studs and a pair of sockets carried by said driven member and disposed over the other two studs, the adjacent inner ends of said sockets having inwardly flanged bottom portions provided with central openings through which said studs extend in spaced relation to the edges of said openings, elastic bushings surrounding said studs and seated in said sockets and bearing against said bottom portions, and means for compressing said bushings between said sockets and said studs whereby relative oscillatory movement between said sockets and studs occurs by flexure of the bushing material.

8. A universal joint connection comprising a coupling element having two pairs of axially aligned apertured bosses, pins extending through said bosses, two aligned pairs of tapering sleeve members secured to separate rotating elements, said pins extending through said sleeve, and elastic bushings disposed about said pins and having cylindrical sections between said pins and said bosses, and conical sections between said pins and said sleeve members.

9. A universal joint connection comprising a coupling element having two pairs of axially aligned apertured bosses, pins extending through said bosses, two aligned pairs of tapering sleeve members secured to separate rotating elements, said pins extending through said sleeves, elastic bushings of initially frusto-conical section disposed about said pins, and means engaging the ends of said pins for imparting axial compression to said bushings to form said frusto-conical bushings into bushings having cylindrical sections between said pins and said bosses, and conical sections between said pins and said sleeve members.

10. A flexible connection comprising driving and driven members each having trunnions, means flexibly connecting the trunnions of one member with the trunnions of the other, said connecting means comprising a seat for each trunnion, each seat being in the shape of the frustum of a cone having its larger base presented outwardly, a bearing block mounted on each trunnion and composed of deformable resilient material and having its outer seat-engaging wall in the shape of the surface of a frustum of a cone, the said bearing block being normally of greater external area than the internal aera of the co-operating seat whereby, when the trunnion and the bearing block thereon are inserted into said seat the bearing block will be compacted between its trunnion and the inner wall of its seat.

11. A flexible connection comprising driving and driven members, means providing for relative oscillatory movement therebetween including trunnions for said members disposed therebetween and lying in a plane normal to the axes of said members, means flexibly connecting the trunnions for one of said members with the trunnions for the other of said members, said connecting means comprising a seat for each trunnion, each seat being in the shape of a frustum of a cone having it larger base presented outwardly, a bearing block mounted on each trunnion and composed of deformable resilient material having its outer seat-engaging wall in the shape of the surface of a frustum of a cone, the said bearing block being normally of greater external area than the internal area of the cooperating seat whereby, when the trunnion and bearing block thereon are inserted into said seat the bearing block will be compressed between its trunnion and the inner wall of said seat.

12. The combination with a driving member and a driven member, of a universal coupling therebetween comprising a yoke-like member carried by each of said driving and driven members, each of said yoke-like members having a pair of spaced tapered sleeves disposed in coaxial alignment, the axes of the sleeves of both said yoke-like members extending normal to each other and lying in a common plane extending normal to the axis of said driving member and disposed between said driving and driven members, an intermediate coupling member lying in said plane and having radially extending pins projecting outwardly from said coupling member through said sleeves, elastic bushings disposed in said sleeves about said pins, and means carried by said pins and movable axially thereof for compressing said bushings between the tapered interior surfaces of said sleeves and said pins to accommodate relative oscillatory movement between said pins and sleeves.

13. The combination with a driving member and a driven member, of a universal coupling therebetween comprising supporting means secured to the adjacent ends of said driving and driven members, oppositely tapered sleeve means disposed in coaxial alignment on opposite sides of the axis of said driving member and carried by said supporting means, oppositely tapered sleeve means disposed in coaxial alignment on opposite sides of the axis of said driven member and extending normal to the axis of the sleeve means carried by said driving member, said last named sleeve means being carried by the supporting means secured to said driven member, all of said sleeve means being disposed in a plane spaced rearwardly of and extending normal to the axis of said driving member, an intermediate coupling member lying in said plane and having radially extending pins carried by said coupling member and projecting outwardly and axially through each of said sleeve means, tapered elastic bushings disposed about said pins and engaging the tapered interior surfaces of said sleeve means, and means mounted at the extending ends of said pins and movable axially thereof for compressing said bushings between said pins and said interior surfaces whereby relative oscillatory movement between said sleeve means and said pins is accommodated by the flexing of said bushings.

14. A universal joint comprising a driving member, a driven member, four stud members adapted to be disposed in aligned pairs at substantially right angles to each other, said stud members having means for securing the same in fixed position upon said driving and driven members, an intermediate coupling member mounted between said stud members, frusto-conical seating sockets formed in said stud members, radially extending pin members on said coupling member extending into said stud members centrally of said sockets, and elastic bushings having frusto-conical lateral surfaces interposed between said pin members and said stud members within said sockets and compressed into tight frictional engagement therebetween whereby relative oscillatory movements between said pin members and stud members are accommodated by flexure of said bushings.

15. A universal joint for coupling a driving member and driven member together in a line of power transmission shafting comprising four studs secured in pairs at right angles to each other on said driving and driven members and projecting into a common plane extending normal to the axis of one of said members intermediate said members, an intermediate coupling member lying in said plane and having radially extending pins, sockets in said studs having frusto-conical seating surfaces and receiving said pins, and elastic bushings interposed about each of said pins within said sockets and compressed axially of said pins into tight frictional engagement with said frusto-conical surfaces of said sockets whereby relative oscillatory movement between said pins and studs is accommodated by flexure of said bushings.

16. A universal joint for coupling a driving member and driven member together in a line of power transmission shafting comprising four studs secured in pairs at right angles to each other on said driving and driven members, respectively, and projecting into a common plane extending normal to the axis of one of said members intermediate said members, an intermediate coupling member lying in said plane and having radially extending pins, sockets in said studs having frusto-conical seating surfaces and receiving said pins, seating surfaces on said coupling member at the inner ends of said pins extending transversely across the adjacent ends of said sockets in spaced relation thereto, and elastic bushings interposed about each of said pins within said sockets and compressed axially of said pins into tight frictional engagement with said frusto-conical surfaces of said sockets and against said transverse seating surfaces of said coupling member whereby relative oscillatory movement between said pins and studs is accommodated by flexure of said bushings.

17. In combination, in a universal joint of the class described including a driving member and a driven member, a pair of diametrically opposed studs, means for securing said studs to said driving member, a second pair of opposed studs at right angles to said first studs, means for securing said second pair of studs to said driven member, sockets in each of said studs having frusto-conical seating surfaces, an intermediate coupling member between said driving and driven members having radially extending pins projecting into said sockets, and elastic bushings about said pins and frictionally engaging said seating surfaces, said securing means maintaining said bushings under compression in said sockets whereby flexure of said bushings accommodates relative oscillatory movement between said pins and studs.

RAYMOND HENRY.